Sept. 3, 1940.   L. C. LUDBROOK   2,213,882
ELECTRICAL CONTROL SYSTEM
Filed Oct. 19, 1938

Inventor:
Leslie C. Ludbrook,
by Harry E. Dunham
His Attorney.

Patented Sept. 3, 1940

2,213,882

UNITED STATES PATENT OFFICE 2,213,882

ELECTRICAL CONTROL SYSTEM

Leslie C. Ludbrook, Rugby, England, assignor to General Electric Company, a corporation of New York Application October 19, 1938, Serial No. 235,861
In Great Britain May 27, 1938

6 Claims. (Cl. 175—363)

This invention relates to electrical control systems and more particularly to improvements in the control of electric valve translating apparatus.

My invention is illustrated as associated with a storage battery type emergency supply system in which a load is normally supplied with current from a main supply circuit, and a storage battery, which is kept in fully charged condition by the supply circuit, is provided for supplying current to the load when the main supply circuit fails.

In accordance with this invention, there is provided new and improved control circuits for electric valve translating apparatus comprising an electric valve means, hereinafter referred to as a grid-controlled vacuum tube or tubes, which automatically maintains a substantially constant current to a load circuit, such as a battery, regardless of normal variations in other connected loads and substantially independent of variations in the voltage of the supply circuit.

As the term is employed herein a grid-controlled vacuum tube is any electric discharge device, whether of the high vacuum type or of the low pressure gas or vapor-filled type, which is provided with means for controlling its conductivity. Such control means is typically a control electrode in the form of a grid but it may be of any other suitable form, such as an immersion type ignitor electrode or it may be a magnet.

The invention will be better understood from the following description taken in connection with the accompanying drawing and its scope will be pointed out in the appended claims.

Figure 1:
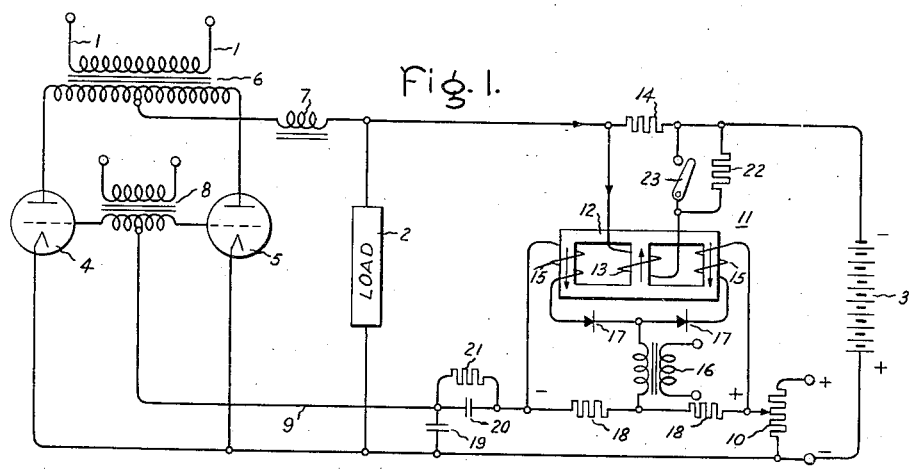
Figure 2:
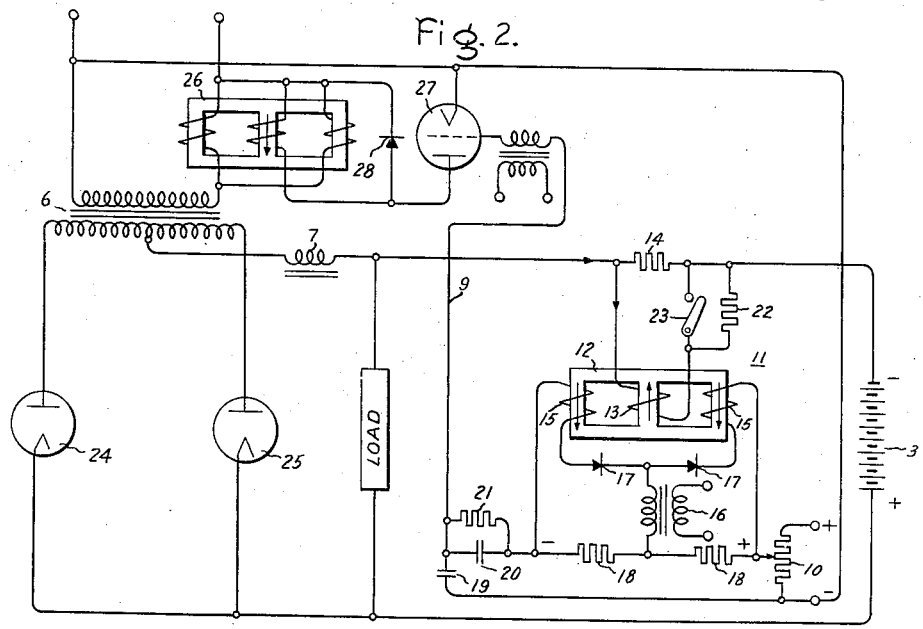
Figure 3:
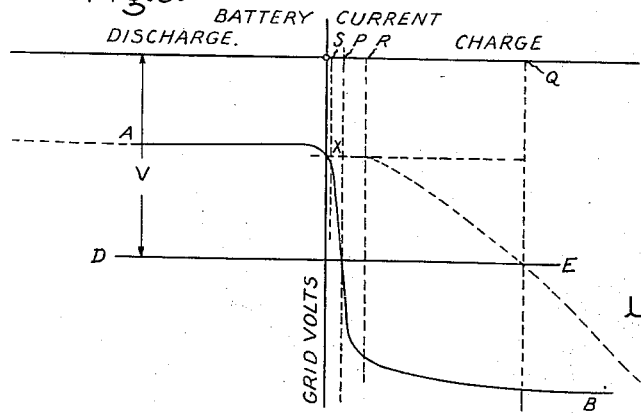

In the drawing, Fig. 1 illustrates diagrammatically an embodiment of the invention employing grid-controlled main rectifier tubes, Fig. 2 is a modification in which the main rectifier tubes are standard two-electrode tubes and the voltage of the rectifier is controlled indirectly through a saturable core reactor by means of an auxiliary grid controlled vacuum tube, and Fig. 3 is an illustration of the control characteristic of Figs. 1 and 2.

Referring now to the drawing and more particularly to Fig. 1, a main supply circuit 1 is arranged to supply current to a load 2 and a second load such as a battery 3. The supply circuit 1 is typically, although not necessarily, an alternating current circuit and a pair of grid-controlled main rectifier tubes 4 and 5 are interposed between the supply circuit and its loads by means of a main transformer 6. A conventional smoothing reactor 7 is provided in the output circuit of the rectifier. An alternating current grid potential is applied to the grids of the rectifier tubes by means of a grid transformer 8 which is connected to any suitable source of alternating current, such for example, as the same source of current which supplies the main supply circuit 1. The midpoint of the secondary winding of the grid transformer 8 is connected to the cathodes of the tubes through a grid circuit 9 which includes a direct current potentiometer arrangement 10 for impressing an adjustable positive unidirectional grid bias potential on the grids.

The automatic control of the rectifier output voltage in response to the battery current is secured by means of a magnetic amplifier 11 of the type which is disclosed and claimed in my copending joint application with Austyn L. Whiteley, S. N. 235,862, filed October 19, 1938, and assigned to the same assignee as the present invention. The magnetic amplifier 11 consists of a three-legged iron core 12 having a direct current control or primary winding 13 on the center leg thereof which is connected to respond to the battery current. It may either be connected in series with the battery or across a shunt 14, as illustrated, in which case it carries but a fixed fraction of the battery current. On the two outer legs of the core are wound variable reactance secondary windings 15 which are connected in parallel circuit relation across a suitable source of alternating current 16. In series with each of the windings 15 are separate half-wave rectifiers 17 and separate resistors 18, the latter being connected in the grid circuit 9.

In order to prevent hunting of the control or regulating circuit there is provided a capacitor 19 in shunt with the grid circuit 9 and a capacitor 20, shunted by a resistor 21, in series in the grid circuit 9. This arrangement acts like an electrical dash pot and retards the rate of change of grid potential when the battery current changes.

The operation of Fig. 1 is as follows. The rectifiers 17 are so connected that positive half waves of the alternating current source 16 cause current to flow through only one of the windings 15 and negative half waves of the source 16 cause current to flow through only the other of the windings 15. These currents must also flow through the resistors 18, thereby causing voltage drops therein which are in such a direction as to produce a negative grid bias potential in the grid circuit 9. If the battery current increases, the unidirectional flux in the core caused by the control winding 13 increases, thereby tending to saturate the core which decreases the reactance of the windings 15, thereby increasing the voltage drop or negative bias produced in the resistors 18. Conversely, a decrease in battery current causes a decrease in the negative bias potential produced in the resistors 18. By winding the windings 15 in such directions that the pulsating fluxes they produce aid or are in the same direction as the unidirectional flux produced by the control winding 13 an effect which amounts to a feed-back or regenerative effect is produced which renders the device extremely sensitive.

The characteristic curve of the unidirectional voltage across the resistors 18 with changes in battery current is shown by the curve AXB in Fig. 3. The characteristic curve of the grid voltage produced by the potentiometer 10 is the straight horizontal line DE because this potential is independent of the battery current. It will be seen that these two grid potential characteristics intersect at a point corresponding to a small battery charging current of value P. If the battery current increases or decreases slightly the negative grid bias varies very rapidly, thereby causing the voltage of the rectifiers 4 and 5 to change in a well-known manner so as to hold the battery charging current between the limiting values of S and R.

After a failure of the main supply circuit the battery will usually be in a discharged condition and in order to recharge it rapidly a resistor 22 and switch 23 are provided in the circuit of the control winding 13. By opening the switch 23 the saturable device 11 is made less sensitive to changes in battery current, its new characteristic being indicated by the curve AXC in Fig. 3. This curve intersects the line DE at a current Q, representing the higher value of charging current which will be obtained when the switch 23 is opened.

In the modification shown in Fig. 2 the main rectifier tubes are conventional two-electrode tubes 24 and 25 and the voltage of these rectifier tubes is controlled by a saturable core reactor which is illustrated by way of example as having a conventional three-legged core 26. The alternating current windings of this reactor are connected in circuit with the primary winding of transformer 6 and the direct current control winding of the reactor is connected across the supply circuit through a grid-controlled rectifier tube 27. In order to smooth out the current in the control winding an additional unidirectional conductor 28 may be connected in parallel with the control winding with its direction of conductivity such as to block the flow of current from the tube 27 therethrough. The grid of the tube 27 is controlled by the grid circuit 9, as in Fig. 1.

The operation of Fig. 2 is such that if the battery current increases slightly from the predetermined value which it is desired to maintain, the change in grid bias potential which is produced will decrease the current through the tube 27, thereby increasing the reactance of the reactor 26 and reducing the output voltage of the main rectifier, while if the battery current decreases below its normal value the current through the rectifier tube 27 will be increased thereby increasing the saturation of the reactor 26 which lowers its reactance and thereby increases the voltage of the rectifiers 24 and 25.

While there have been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In combination, an alternating current circuit, a direct current circuit, electric translating apparatus connected between said circuits and including electric valve means having a control electrode, an excitation circuit for said control electrode including means for producing a variable unidirectional potential in said excitation circuit comprising a pair of resistances serially connected therein, a winding and a unidirectional conducting device serially connected across one of said resistances, a second winding and a second unidirectional conducting device serially connected across the other of said resistances, a common alternating current circuit for causing positive half cycles of current to flow through one of said windings and to cause the negative half cycles of current of said second mentioned alternating current circuit to flow through the other winding thereby establishing in said excitation circuit a resultant unidirectional voltage, and means for varying the inductive reactance of the windings to control the magnitude of said unidirectional voltage.

2. In combination, an alternating current circuit, a load circuit, electric translating apparatus connected between said circuits and comprising an electric valve means having a control electrode, an excitation circuit connected to said control electrode and comprising a source of direct current and a voltage divider for producing a substantially constant positive unidirectional biasing potential, and means for introducing into said excitation circuit a negative unidirectional biasing potential which varies in accordance with a predetermined controlling influence derived from one of said first mentioned circuits and including a magnetic amplifier having a core structure, a control winding variably energized in accordance with said controlling influence and a pair of inductively associated secondary windings the inductive reactance of which varies in response to the magnetization of said core structure, a pair of resistances connected in series relation in said excitation circuit, a source of alternating current and a pair of unidirectional conducting devices for transmitting variable amounts of unidirectional current through said secondary windings and said resistances to vary the magnitude of said negative unidirectional biasing potential in accordance with said controlling influence.

3. In combination, an alternating current supply circuit, a direct current load circuit, electric translating apparatus connected between said circuits and comprising an electric valve means having a control electrode, and an excitation circuit connected to said control electrode and comprising a source of substantially constant positive unidirectional biasing potential and means for controlling the resultant voltage impressed on said control electrode comprising a magnetic amplifier having a core structure, a primary winding and a pair of secondary windings, a pair of serially connected resistances connected in said excitation circuit, a source of alternating current and a pair of unidirectional conducting devices for transmitting unidirectional current from said source through said resistances in series relation with said secondary windings and means for variably energizing said primary winding to control the inductive reactance of said secondary windings in accordance with a predetermined electrical quantity of said load circuit.

4. In combination, an alternating current supply circuit, a direct current load circuit, electric translating apparatus connected between said circuits and comprising an electric valve means having a control electrode, means for impressing on said control electrode a substantially constant positive unidirectional biasing potential, a pair of serially connected resistances connected between said last mentioned means and said control electrode, means for producing across said resistances a resultant negative unidirectional biasing potential to maintain the current transmitted to said load circuit at a substantially constant value comprising a magnetic amplifier having a core structure, a primary winding and a pair of secondary windings, a source of alternating current, a pair of unidirectional conducting devices each connected to said source and in series relation with a different one of said secondary windings and a different one of said resistances, and means for variably energizing said primary winding in response to the current transmitted to said load circuit to vary the inductive reactance of said secondary windings thereby varying the negative unidirectional biasing potential to maintain the load current constant.

5. In combination, an alternating current supply circuit, a direct current load circuit, electric translating apparatus connected between said circuits and comprising an electric valve means having a control electrode, means for impressing on said control electrode a substantially constant positive unidirectional biasing potential, a resistance, and means for controlling the conductivity of said electric valve means to maintain the load current substantially constant comprising a magnetic amplifier having a core structure, a primary winding energized in response to the load current and a secondary winding, a source of alternating current and a unidirectional conducting device for transmitting variable amounts of unidirectional current from said source through said resistance and said secondary winding to produce across the terminals of said resistance a variable negative unidirectional biasing potential thereby controlling the conductivity of said electric valve means.

6. In combination, an alternating current circuit, a direct current circuit, electric translating apparatus connected between said circuits and comprising an electric valve means having a control electrode, an excitation circuit connected to said control electrode for controlling the conductivity of said electric valve means and thereby controlling the power interchanged between said first mentioned circuits, and means for introducing into said excitation circuit a control voltage to control the conductivity of said electric valve means in response to a predetermined electrical condition derived from one of said first mentioned circuits and including a resistance connected in said excitation circuit, a magnetic amplifier having a core structure, a primary winding and a secondary winding, a source of alternating current, a unidirectional conducting device connected to transmit variable amounts of unidirectional current from said source in series relation through said resistance and said secondary winding and means for energizing said primary winding in response to said electrical condition to vary the inductive reactance of said secondary winding thereby varying the current transmitted through said resistance.

LESLIE C. LUDBROOK.